(12) United States Patent
Dhoot et al.

(10) Patent No.: US 10,574,712 B2
(45) Date of Patent: Feb. 25, 2020

(54) PROVISIONING CONFERENCE ROOMS

(71) Applicant: International Business Machines Corporation, Armonk, NY (US)

(72) Inventors: Akash U. Dhoot, Pune (IN); Shailendra Moyal, Pune (IN); Bhavuk Srivastava, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 180 days.

(21) Appl. No.: 15/047,660

(22) Filed: Feb. 19, 2016

(65) Prior Publication Data

US 2017/0244766 A1    Aug. 24, 2017

(51) Int. Cl.
| | | |
|---|---|---|
| *G06F 15/16* | (2006.01) | |
| *H04L 29/06* | (2006.01) | |
| *H04L 12/58* | (2006.01) | |
| *G06F 16/9535* | (2019.01) | |

(52) U.S. Cl.
CPC ............ *H04L 65/403* (2013.01); *H04L 51/04* (2013.01); *H04L 51/046* (2013.01); *H04L 51/24* (2013.01); *H04L 51/26* (2013.01); *H04L 51/32* (2013.01); *H04L 65/1069* (2013.01); *G06F 16/9535* (2019.01)

(58) Field of Classification Search
CPC .. H04L 65/403; H04L 65/1069; H04L 51/046
See application file for complete search history.

(56) References Cited

U.S. PATENT DOCUMENTS

| | | |
|---|---|---|
| 5,784,561 A | 7/1998 | Bruno et al. |
| 6,917,962 B1 | 7/2005 | Cannata et al. |
| 6,959,322 B2 | 10/2005 | Ludwig et al. |
| 7,185,054 B1 | 2/2007 | Ludwig et al. |
| 7,966,370 B1 | 6/2011 | Pegg et al. |
| 8,239,454 B2 | 8/2012 | Palermo |
| 8,627,210 B2 | 1/2014 | Vijayakumar et al. |
| 8,762,405 B2 | 6/2014 | Qian et al. |
| 8,837,701 B1 | 9/2014 | Moore et al. |
| 9,110,977 B1 * | 8/2015 | Pierre ................. G06F 16/2228 |
| 9,409,991 B2 | 8/2016 | Thiry et al. |

(Continued)

FOREIGN PATENT DOCUMENTS

WO    2013134728 A1    9/2013

OTHER PUBLICATIONS

Disclosed Anonymously et al., "Method and Apparatus for Trust, Vicinity, Natural Language Processing Based Collaboration Leveraging Insights-Based Cognitive Models", An IP.com Prior Art Database Technical Disclosure, IP.com No. 000241376, printed on Nov. 9, 2015, 5 pages.

(Continued)

*Primary Examiner* — Richard G Keehn

(74) *Attorney, Agent, or Firm* — James H. Mayfield; Alexander G. Jochym; William H. Hartwell

(57) ABSTRACT

A method, executed by a computer, for provisioning chat rooms (e.g. audio, video, and/or text-based communication) includes determining a topic by accessing one or more user communities, creating a chat corresponding to the topic, selecting one or more users to invite to the chat using a template, and inviting the one or more users to the chat. A computer program product and computer system corresponding to the above method are also disclosed herein.

11 Claims, 4 Drawing Sheets

(56) References Cited

U.S. PATENT DOCUMENTS

| | | | |
|---|---|---|---|
| 2003/0208543 A1* | 11/2003 | Enete | H04L 12/1822 709/206 |
| 2003/0222907 A1* | 12/2003 | Heikes | G06Q 10/107 715/745 |
| 2004/0172415 A1* | 9/2004 | Messina | G06F 17/30864 |
| 2006/0042483 A1 | 3/2006 | Work et al. | |
| 2006/0155823 A1* | 7/2006 | Tran | G06F 17/30902 709/216 |
| 2009/0248882 A1 | 10/2009 | Takagi et al. | |
| 2010/0191799 A1* | 7/2010 | Fiedorowicz | G06F 17/30873 709/203 |
| 2010/0325214 A1 | 12/2010 | Gupta | |
| 2011/0035793 A1* | 2/2011 | Appelman | H04L 67/14 726/9 |
| 2012/0072384 A1 | 3/2012 | Schreiner et al. | |
| 2012/0290950 A1* | 11/2012 | Rapaport | H04L 51/32 715/753 |
| 2012/0316959 A1* | 12/2012 | Hymel | G06Q 30/0251 705/14.53 |
| 2013/0080927 A1* | 3/2013 | Weaver | G06Q 10/10 715/758 |
| 2013/0097236 A1* | 4/2013 | Khorashadi | H04H 60/25 709/204 |
| 2013/0179438 A1 | 7/2013 | Coldicott et al. | |
| 2013/0205027 A1* | 8/2013 | Abuelsaad | G06F 9/5072 709/226 |
| 2014/0132702 A1 | 5/2014 | Leibovich et al. | |
| 2014/0201126 A1* | 7/2014 | Zadeh | G06N 7/005 706/52 |
| 2014/0236953 A1 | 8/2014 | Rapaport et al. | |
| 2014/0244420 A1 | 8/2014 | Chatter et al. | |
| 2015/0248739 A1* | 9/2015 | Schulman | G06Q 50/2053 434/322 |
| 2015/0331865 A1* | 11/2015 | Bank | G06F 17/30525 707/723 |

OTHER PUBLICATIONS

Dhoot et al., "Provisioning Conference Rooms", U.S. Appl. No. 15/408,581, filed Jan. 18, 2017, 23 pages.

IBM Appendix P, list of patents and patent applications treated as related, dated Jan. 18, 2017, 2 pages.

Chen et al., "Detecting Offensive Language in Social Media to protect Adolescent Online Safety", Sep. 3, 2012, pp. 71-80.

* cited by examiner

PROVISIONING CONFERENCE ROOMS

BACKGROUND OF THE INVENTION

The present invention relates generally to online collaboration, and more specifically, to provisioning online conferencing rooms such as chat rooms.

In the field of online communication, options for chat and conferencing have grown due to an increase in the availability of network bandwidth. As text, audio, and video conferencing have increased, so have the number of conferencing rooms dedicated to a particular subject of conversation. Often a user may wish to find other users with specific traits, habits, or qualifications. One challenge is introducing users to each other in order to facilitate such expertise-based collaboration.

SUMMARY

As disclosed herein, a method, executed by a computer, for provisioning online conferencing rooms (e.g. audio, video, and/or text-based communication) includes determining a topic by accessing one or more user communities, creating a conference corresponding to the topic, selecting one or more users to invite to the chat using a template, and inviting the one or more users to the chat. A computer program product and computer system corresponding to the above method are also disclosed herein.

DETAILED DESCRIPTION

Embodiments of the present invention relate generally to online collaboration, and more specifically, to the social- and context-based provisioning of online conference rooms such as chat rooms. Provisioning a conference room may be defined as proving the resources necessary to host a collaborative conference among two or more users. The particular means through which the users communicated may be audio, video, text, or any combination thereof. Embodiments of the present invention enable conference rooms to be provisioned automatically so that a user can seamlessly be connected to other users having specific traits, habits, and/or qualifications.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of the invention as set forth hereinafter. The present invention will now be described in detail with reference to the figures.

Figure 1:
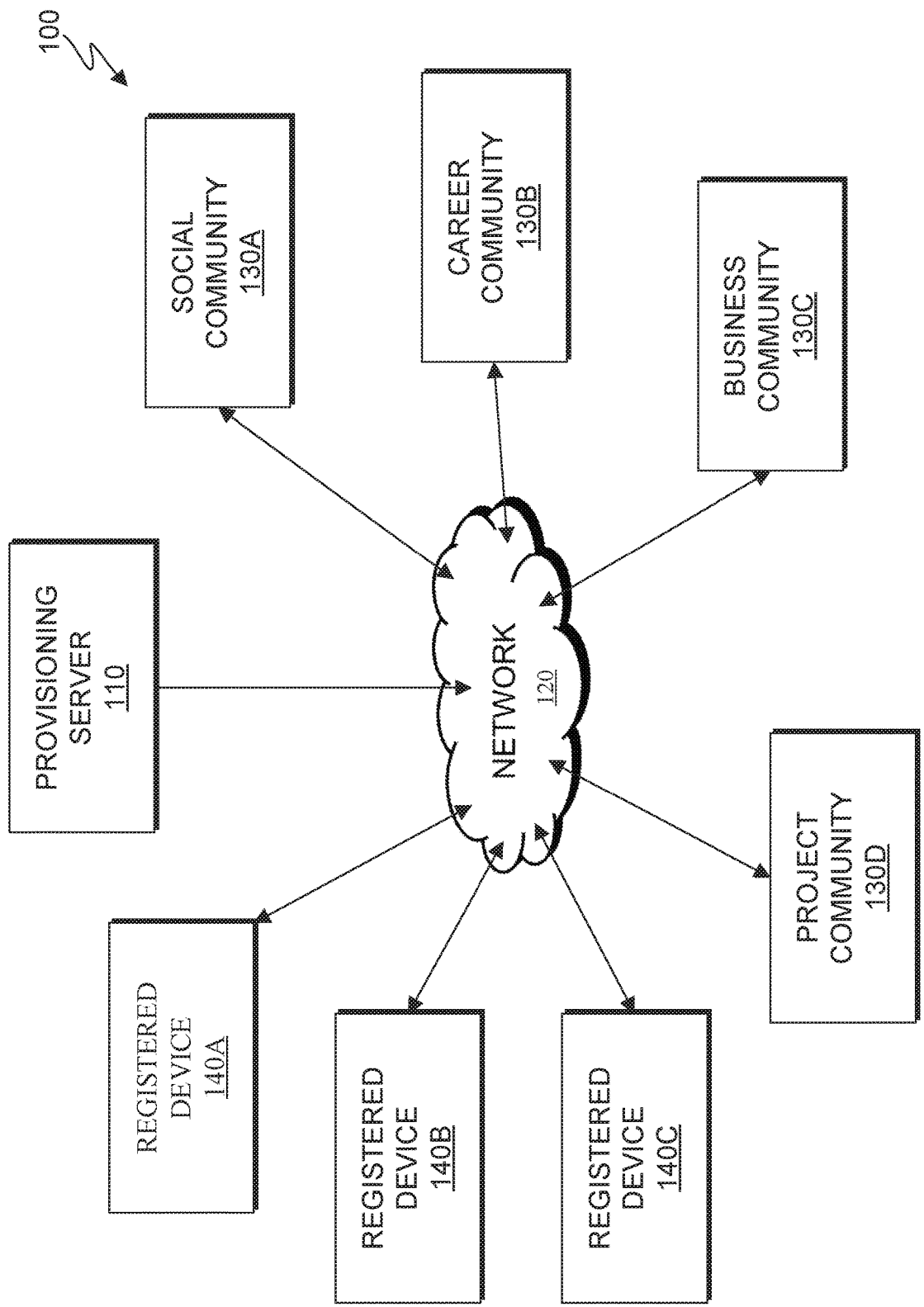
FIG. 1 is a block diagram depicting one embodiment of a room provisioning environment in accordance with the present invention.

FIG. 1 is a block diagram depicting one embodiment of a room provisioning environment 100 in accordance with the present invention. As depicted, the room provisioning environment 100 includes a provisioning server 110, network 120, communities 130A-130D, and registered devices 140A-140C. The room provisioning environment 100 enables a provisioning server 110 to introduce various users to each other based on their participation in communities 130.

The provisioning server 110 may provision conference/chat rooms so that users may collaborate with each other. In some embodiments, the conference room is hosted on the provisioning server 110. The provisioning server 110 may serve as an intermediary between users, who then directly connect to each other's devices once the users are introduced. The provisioning server may crawl one or more communities in order to gain information about users that enables social- and context-based room provisioning. For example, the provisioning server 110 may crawl a career community 130B in order to place an employer in contact with a job-seeking user. The provisioning server 110 may communicate with social communities 130A-130D and registered devices 140A-140D via the network 120, which may be an intranet, or network such as the Internet.

The communities 130 may include one or more of a social community 130A, career community 130B, business community 130C, and project community 130D. Any sort of social community or collaborative database may be suitable to serve as a community 130. The social community 130A, for example, may include social networks. In some embodiments, social community 130A includes casual content, such as friendship content, status updates, currently trending news, birthdays, entertainment media, and the like. Career community 130B may include such communities as career-focused social networks, job search websites, resume bulletin boards, and the like. Business community 130C may represent such communities as corporate intranets, market-tracking websites, corporate productivity trackers, and the like. Project community 130D may include niche communities that relate to special interests or projects, such as an ad hoc community formed to come up with a new advertising campaign, or a group project for an engineering thesis program.

The registered devices 140A-140C may include any sort of device through which users may communicate once a conference room is provisioned by provisioning server 110. Registered devices 140A-140C may include laptops, desktops, smartphones, tablets, PDAs, phablets, and the like. In some embodiments, a user's registered device(s) 140 is/are registered with the provisioning server 110, as it serves as a central node. The provisioning server 110 may introduce two or more users of the conference provisioning service together, who may then communicate via their registered devices 140.

Figure 2:
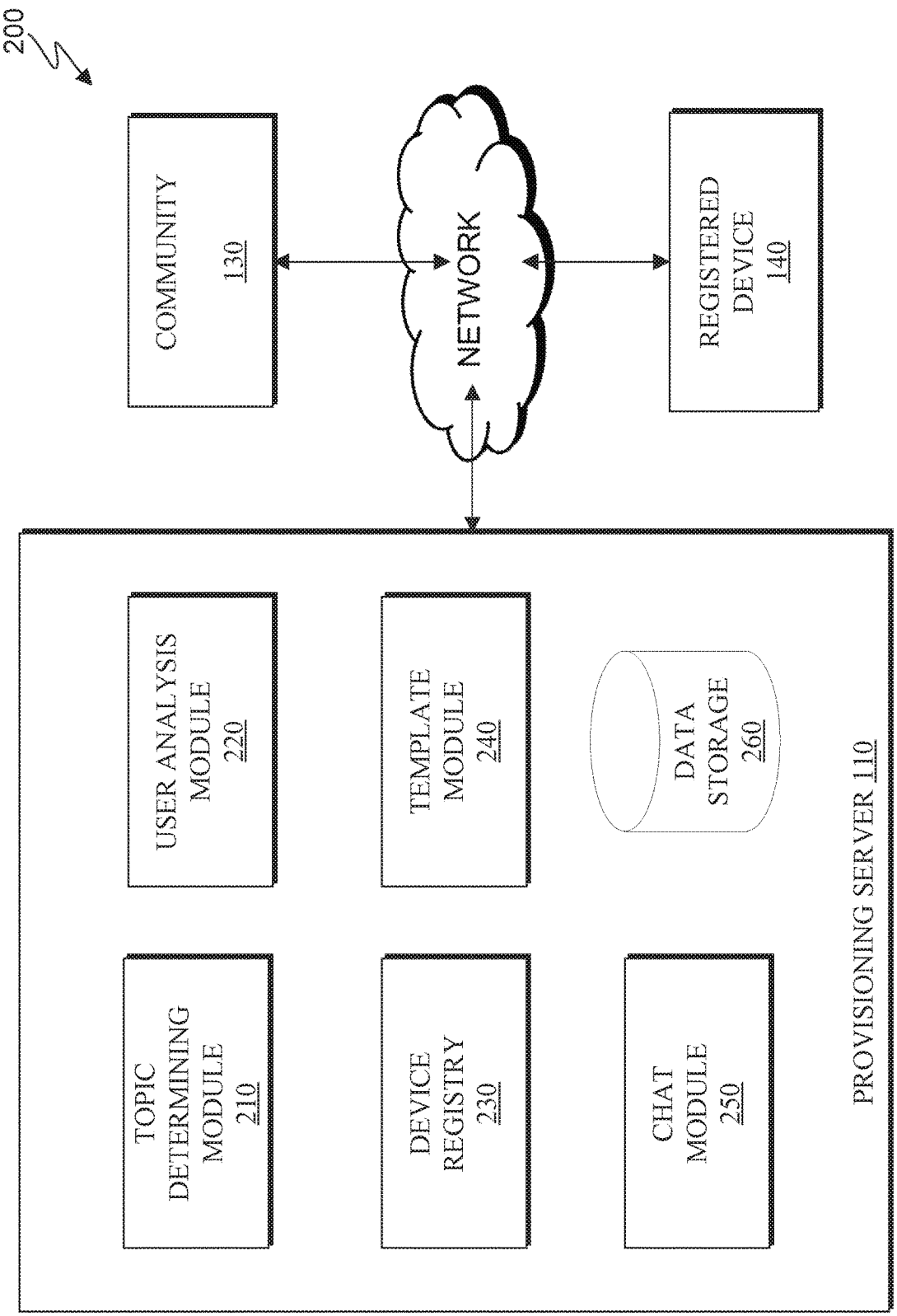
FIG. 2 is a block diagram depicting one embodiment of a room provisioning system in accordance with the present invention.

FIG. 2 is a block diagram depicting one embodiment of a room provisioning system 200 in accordance with the present invention. As depicted, the room provisioning system 200 includes a provisioning server 110 with topic determining module 210, user analysis module 220, device registry 230, template module 240, chat module 250, data storage 260, community 130, and registered device 140. The community 130 and registered device 140 are included to demonstrate their relationship to provisioning server 110, and have already been described in the discussion of FIG. 1.

The provisioning server 110 may access the one or more communities 130 via its topic determining module 210 in order to find a suitable topic for a room. The topic determining module 210 may provide a topic, or broad subject of discussion, for the conference. In some embodiments, users may search a database of the topics of conferences in order to find a conference of their interest. The topic determining module 210 may determine topics by performing statistical analyses of a community 130. For example, the topic determining module 210 may determine that a particular topic, such as a newsworthy event, is trending on community 130. By identifying this newsworthy event as a topic, the topic determining module 210 may enable the provisioning server 110 to create a chat whose subject of discussion is the newsworthy event. In some embodiments, the topics are not necessarily presented to a user, as the topics may not be human-readable (e.g., a "topic" may consist of a long string of terms separated by boolean operators. In embodiments where the topics are not presented to a user, the room provisioning system 200 may determine a user's interests and on that basis may recommend conferences to a user.

The user analysis module 220 may analyze users of a community 130. In particular, the user analysis module 220 may determine the interests, likes, and dislikes of users by analyzing the users' posts, liked items, uploaded material, websites to which a user links, and the like. The user analysis module 220 may create a user score for each user. In some embodiments, the user score is a composite of a user's social score, career score, and business score. The social aspect of a user score may include how informative a user is, how social the user is, how active the user is on a community, which language(s) a user speaks, a user's personality traits such as terseness, prolix, tendency to use nice or rude language, and the like. The user analysis module 220 may produce the career aspect of a user score by analyzing a user's background and résumé details such as education, skills, and accomplishments. The user analysis module 220 may arrive at the business metric of a user score by analyzing a user's on-the-job performance, quality and quantity of work, productivity, and the like. Thus, a user score may, by numerous metrics, take into account a user's competency in any given area. In some embodiments, the user analysis module 220 predicts a user's current availability based on previous account activity, the time zone in which the user resides, and the like.

The device registry 230 may include one or more databases in which users' devices are listed. A registered device 140 is any sort of network-enabled communication device, such as a laptop, desktop, phone, smartphone, tablet, phablet, and the like. A user may elect to register one or multiple devices with the device registry 230. The provisioning server 110 may use the device registry 230 to look up a user's registered device 140 in order to initiate a conference with the user. In some embodiments, a user may register multiple devices with the device registry 230 and optionally set a preferential order for the user to be contacted. For example, a user might have two registered devices 140, a smartphone and a laptop. When it is time to contact this user, the device registry 230 may indicate that the user's smartphone and laptop should both be called at the same time, or that the smartphone should be tried first, and if the user doesn't answer, then a call attempt should take place to the laptop. The device registry 230 may also include a means by which users can change registered device preferences, such as the call priority of their devices, whether to initiate a conference in audio, video, text, or any combination thereof, how long to try to contact a device, as well as a means to add or remove registered devices 140.

The template module 240 may include instructions to generate, store, and organize conference room templates. The provisioning server 110 may use templates to find specific users for a conference room based on the room's topic and the users' user scores. For example, if a conference room topic is Company X's fourth quarter finances, then the template module may find users who have a combination of properties that indicate that they are appropriate for a discussion of Company X's fourth quarter. The template module 240 may generate a template that ranks users who have a high social score relating to economics, and a high business score relating to Company X. The template module 240 may recall templates from previous discussions that would be appropriate for a new conference. For example, the template module 240 may base a template for conference regarding 2016 best-selling novels off of a template for a conference regarding 2015 best-selling novels. A template may weigh the various aspects of a user score separately; for example, a template may emphasize a user's career score over a business score and a user's business score over a social score. Thus, the template module 240 may enable the provision server 110 to provision conference rooms for users whose interests, knowledge, opinions, and/or project goals are compatible. In some embodiments, the template module 240 dynamically produces templates based on information received from the topic determining module 210 and user analysis module 220.

The chat module 250 may provision and maintain conference rooms, as well as invite users to the conference rooms. In some embodiments, the chat module 250 hosts the conference room by instructing the room provisioning system 200 to allocate computing and networking resources. The chat module 250 may dynamically create a new conference room when it receives a topic from the topic determining module 210 and a template from the template module 240. The chat module 250 may invite users to a conference room by notifying the users on their registered device(s) 140. In some embodiments, the notification is a telephone, call, VoIP call, SMS message, MMS message, calendar event, email, third-party application notification, and the like. The chat module 250 may enable a user to create conference rooms that are invite-only.

Data storage 260 may be accessed by any of the modules of the provisioning server 110, community 130, and/or registered device in order to store or retrieve data. Stored information may include templates, user information, user scores, conference room logs, and the like.

Figure 3:
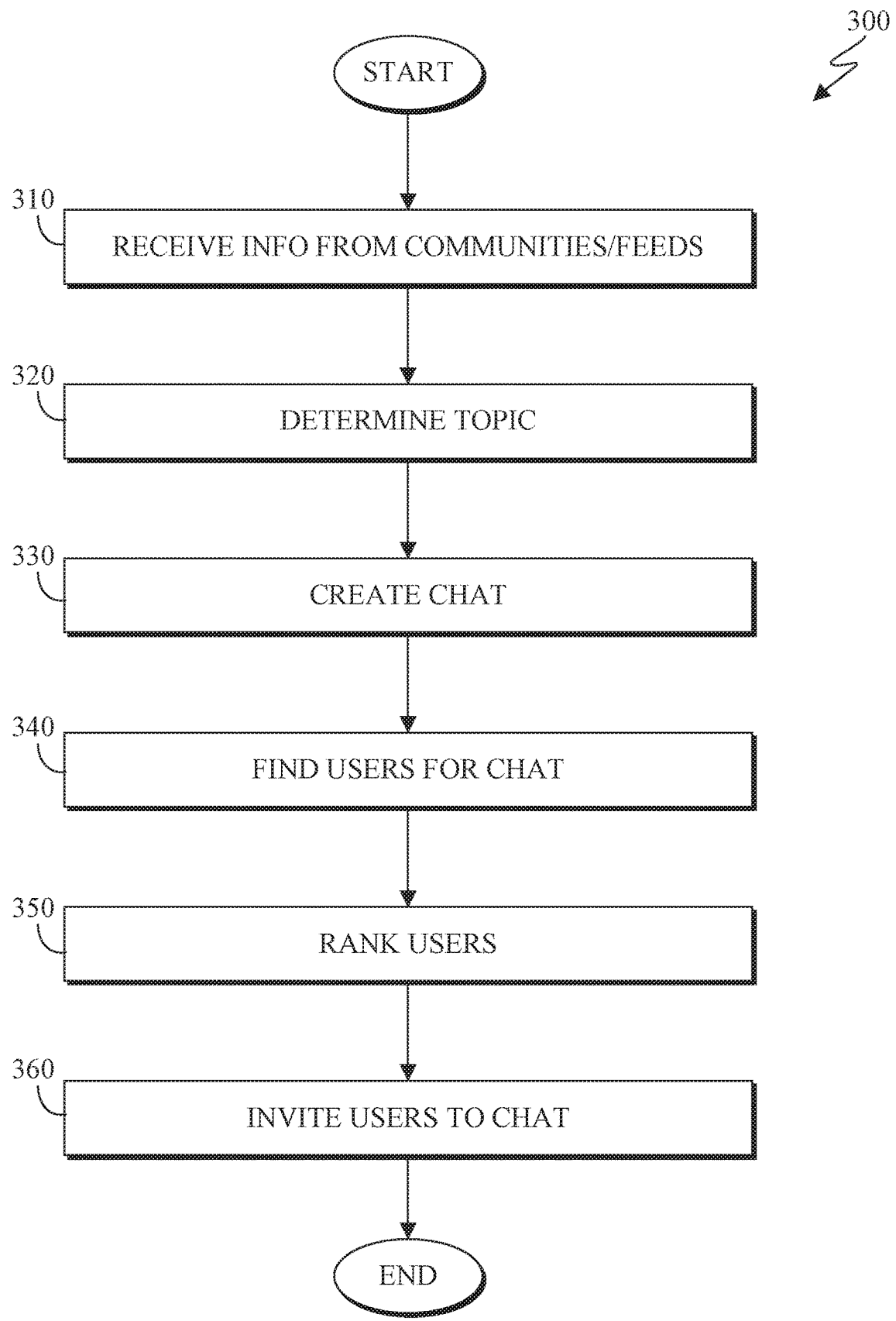
FIG. 3 is a flowchart depicting one embodiment of a room provisioning method in accordance with the present invention.

FIG. 3 is a flowchart depicting one embodiment of a room provisioning method 300 in accordance with the present invention. As depicted, the room provisioning method 300 includes receiving (310) information, determining (320) a topic, creating (330) a chat, finding (340) users for a chat, ranking (350) users, and inviting (360) users to the chat. The room provisioning method 300 may use the room provisioning system 200 to provision conference rooms to users.

Receiving (310) information from communities and/or feeds may include receiving details from news feeds and/or receiving trending activities from social collaborations or communities. The communities may include social communities, career communities, business communities, and project communities as disclosed earlier in the discussion of FIG. 1. In some embodiments, news feeds and social media are crawled in real-time in order to obtain information relating to what is popular or trending at a given time.

Determining (320) a topic may include determining a topic of conversation or theme for a conference room. In some embodiments, the topic determination operation 320 is performed by the topic determining module 210. The topic determining module 320 may involve crawling networks and determining new topics for new conference rooms in real time.

Creating (330) a chat may include creating a conference room dedicated to the topic. The conference room may be created and maintained by the chat module 250. In some embodiments, the chat creation module 330 creates a placeholder for a conference room, and the conference room is fully deployed when users log into the room.

Finding (340) users for a chat may include using the user analysis module 220 to find suitable users on one or more communities 130 to invite to the conference room. In some embodiments, the users are selected based on their user score and the template for the conference room, which is created by the template module 240. For example, the template may instruct chat module 250 to find users whose user scores are relatively high in the social component but low in the career score.

Ranking (350) the users may include sorting users using the template according to their user scores. In some embodiments, users are filtered out based on their user scores in order to limit a conference room to users that possess certain desirable aspects. Inviting (360) the users may include sending an invitation to the provisioned conference room. In some embodiments, the users are notified of their invitation via their registered device 140.

Figure 4:
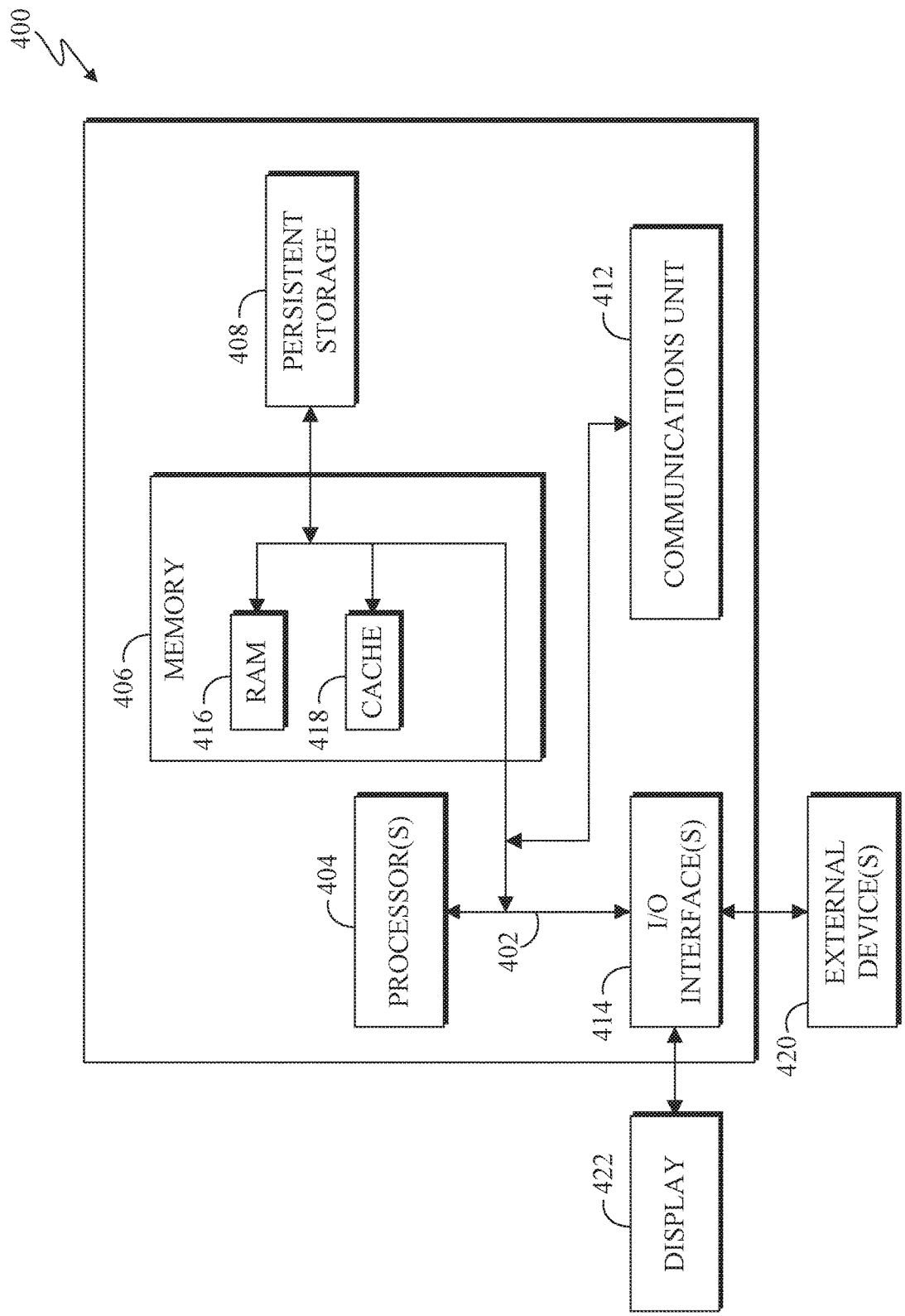
FIG. 4 is a block diagram depicting one example of a computing apparatus (i.e., computer) suitable for executing the methods disclosed herein.

FIG. 4 is a block diagram depicting components of a computer 400 suitable for executing the methods disclosed herein. It should be appreciated that FIG. 4 provides only an illustration of one embodiment and does not imply any limitations with regard to the environments in which different embodiments may be implemented. Many modifications to the depicted environment may be made.

As depicted, the computer 400 includes communications fabric 402, which provides communications between computer processor(s) 404, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In the depicted embodiment, memory 406 includes random access memory (RAM) 416 and cache memory 418. In general, memory 406 can include any suitable volatile or non-volatile computer readable storage media.

One or more programs may be stored in persistent storage 408 for execution by one or more of the respective computer processors 404 via one or more memories of memory 406. The persistent storage 408 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links.

I/O interface(s) 414 allows for input and output of data with other devices that may be connected to computer 400. For example, I/O interface 414 may provide a connection to external devices 420 such as a keyboard, keypad, a touch screen, and/or some other suitable input device. External devices 420 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 408 via I/O interface(s) 414. I/O interface(s) 414 may also connect to a display 422. Display 422 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The embodiments disclosed herein include a system, a method, and/or a computer program product. The computer program product may include a computer readable storage medium (or media) having computer readable program instructions thereon for causing a processor to carry out the methods disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for provisioning online conferencing rooms, the method comprising:
    accessing one or more user communities;
    responsive to accessing the one or more user communities, determining a topic based on the one or more user communities, wherein determining the topic includes crawling networks in real time to obtain information relating to what topics are trending in the one or more user communities;
    creating an online conferencing session corresponding to the topic;
    ranking one or more users based, at least in part, on a user score and current availability of the user, wherein the user score is a composite of social aspects of the user, career aspects of the user, and business metrics associated with the user;
    selecting one or more users from the ranked one or more users to invite to the online conferencing session, wherein selecting the one or more users includes utilizing a template that emphasizes each of the ranked one or more users compatible with the topic; and
    inviting the selected one or more users to the online conferencing session.

2. The method of claim 1, wherein the one or more communities include one or more of a social media community, a news community, a project community, and a marketplace community.

3. The method of claim 1, wherein the one or more users communicate in the online conferencing session by one or more of text, audio, and video.

4. The method of claim 1, wherein inviting the one or more users to the online conferencing session comprises alerting one or more registered devices of each user.

5. A computer system for provisioning online conferencing rooms, the computer system comprising:
- one or more computer processors;
- one or more computer readable storage media; and
- program instructions stored therein for execution by at least one of the one or more computer processors, the program instructions comprising instructions for:
- accessing one or more user communities;
- responsive to accessing the one or more user communities, determining a topic based on the one or more user communities, wherein determining the topic includes crawling networks in real time to obtain information relating to what topics are trending in the one or more user communities;
- creating an online conferencing session corresponding to the topic;
- ranking one or more users based, at least in part, on a user score and current availability of the user, wherein the user score is a composite of social aspects of the user, career aspects of the user, and business metrics associated with the user;
- selecting one or more users from the ranked one or more users to invite to the online conferencing session, wherein selecting the one or more users includes utilizing a template that emphasizes each of the ranked one or more users compatible with the topic; and
- inviting the selected one or more users to the online conferencing session.

6. The computer system of claim 5, wherein the one or more communities include one or more of a social media community, a news community, a project community, and a marketplace community.

7. The computer system of claim 5, wherein the one or more users communicate in the online conferencing session by one or more of text, audio, and video.

8. The computer system of claim 5, wherein inviting the one or more users to the online conferencing session comprises alerting one or more registered devices of each user.

9. A computer program product for provisioning online conferencing rooms, the computer program product comprising:
- a computer readable storage medium and program instructions stored on the computer readable storage medium, the program instructions comprising instructions for:
- accessing one or more user communities;
- responsive to accessing the one or more user communities, determining a topic based on the one or more user communities, wherein determining the topic includes crawling networks in real time to obtain information relating to what topics are trending in the one or more user communities;
- creating an online conferencing session corresponding to the topic;
- ranking one or more users based, at least in part, on a user score and current availability of the user, wherein the user score is a composite of social aspects of the user, career aspects of the user, and business metrics associated with the user;
- selecting one or more users from the ranked one or more users to invite to the online conferencing session, wherein selecting the one or more users includes utilizing a template that emphasizes each of the ranked one or more users compatible with the topic; and
- inviting the selected one or more users to the online conferencing session.

10. The computer program product of claim 9, wherein the one or more communities include one or more of a social media community, a news community, a project community, and a marketplace community.

11. The computer program product of claim 9, wherein inviting the one or more users to the online conferencing session comprises alerting one or more registered devices of each user.

* * * * *